United States Patent
Davydov et al.

(10) Patent No.: US 10,939,321 B2
(45) Date of Patent: Mar. 2, 2021

(54) POWER BOOSTING AND TRANSPORT BLOCK SIZE (TBS) DESIGN IN A NEW RADIO (NR) SYSTEM

(71) Applicant: APPLE INC., Cupertino, CA (US)

(72) Inventors: Alexei Davydov, Nizhny Novgorod (RU); Seung Hee Han, San Jose, CA (US); Debdeep Chatterjee, San Jose, CA (US); Hong He, Sunnyvale, CA (US); Gregory V. Morozov, Nizhny Novgorod (RU); Ajit Nimbalker, Fremont, CA (US); Fatemeh Hamidi-Sepehr, Santa Clara, CA (US); Dae Won Lee, Portland, OR (US); Yongjun Kwak, Portland, OR (US)

(73) Assignee: APPLE INC., Cupertino, CA (US)

( * ) Notice: Subject to any disclaimer, the term of this patent is extended or adjusted under 35 U.S.C. 154(b) by 116 days.

(21) Appl. No.: 16/126,999

(22) Filed: Sep. 10, 2018

(65) Prior Publication Data

US 2019/0045390 A1     Feb. 7, 2019

Related U.S. Application Data

(60) Provisional application No. 62/567,175, filed on Oct. 2, 2017, provisional application No. 62/556,986, filed on Sep. 11, 2017.

(51) Int. Cl.
*H04W 28/02*     (2009.01)

(52) U.S. Cl.
CPC ... *H04W 28/0273* (2013.01); *H04W 28/0289* (2013.01)

(58) Field of Classification Search
CPC ... H04L 1/0058; H04L 5/0007; H04L 1/0045; H04W 4/00; H04W 28/0273; H04W 28/0289; H04W 72/042
See application file for complete search history.

(56) References Cited

U.S. PATENT DOCUMENTS

| | | | |
|---|---|---|---|
| 2014/0204854 A1* | 7/2014 | Freda | H04W 72/042 370/329 |
| 2015/0365930 A1* | 12/2015 | Tabet | H04L 5/0053 370/329 |
| 2019/0045533 A1* | 2/2019 | Chatterjee | H04L 5/0094 |

* cited by examiner

*Primary Examiner* — Iqbal Zaidi

(57) ABSTRACT

Technology for a user equipment (UE) operable to determine a transport block size (TBS) is disclosed. The UE can determine a number of assigned resource elements (REs) in one or more symbols for a transport block. The UE can determine a reference number of REs per physical resource block (PRB) in the transport block based on a reference number of REs for the transport block corresponding to each PRB and an assigned number of PRBs for the transport block. The UE can determine a TBS for the transport block based at least on the reference number of REs per PRB in the transport block. The UE can encode information in a selected transport block for transmission via a physical uplink shared channel (PUSCH) to a Next Generation NodeB (gNB) in accordance with the TBS determined at the UE.

20 Claims, 11 Drawing Sheets

| NREs/PRB | NRBs | | | | | | | | | | |
|---|---|---|---|---|---|---|---|---|---|---|---|
| | 100 | 99 | 98 | 97 | 96 | 95 | 94 | 93 | 92 | 91 | 90 |
| 152 | 15200 | 15048 | 14896 | 14744 | 14592 | 14440 | 14288 | 14136 | 13984 | 13832 | 13680 |
| 144 | 14400 | 14256 | 14112 | 13968 | 13824 | 13680 | 13536 | 13392 | 13248 | 13104 | 12960 |
| 132 | 13200 | 13068 | 12936 | 12804 | 12672 | 12540 | 12408 | 12276 | 12144 | 12012 | 11880 |
| 120 | 12000 | 11880 | 11760 | 11640 | 11520 | 11400 | 11280 | 11160 | 11040 | 10920 | 10800 |
| 108 | 10800 | 10692 | 10584 | 10476 | 10368 | 10260 | 10152 | 10044 | 9936 | 9828 | 9720 |
| 96 | 9600 | 9504 | 9408 | 9312 | 9216 | 9120 | 9024 | 8928 | 8832 | 8736 | 8640 |

POWER BOOSTING AND TRANSPORT BLOCK SIZE (TBS) DESIGN IN A NEW RADIO (NR) SYSTEM

RELATED APPLICATIONS

The present application claims the benefit of U.S. Provisional Patent Application No. 62/556,986, filed Sep. 11, 2017, and U.S. Provisional Patent Application No. 62/567,175, filed Oct. 2, 2017, the entire specifications of which are hereby incorporated by reference in their entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 is a table of values for numbers of resource elements (NREs) based on different values of NREs per physical resource block (PRB) and a number of PRBs (NRBs) in accordance with an example;

Figure 1:
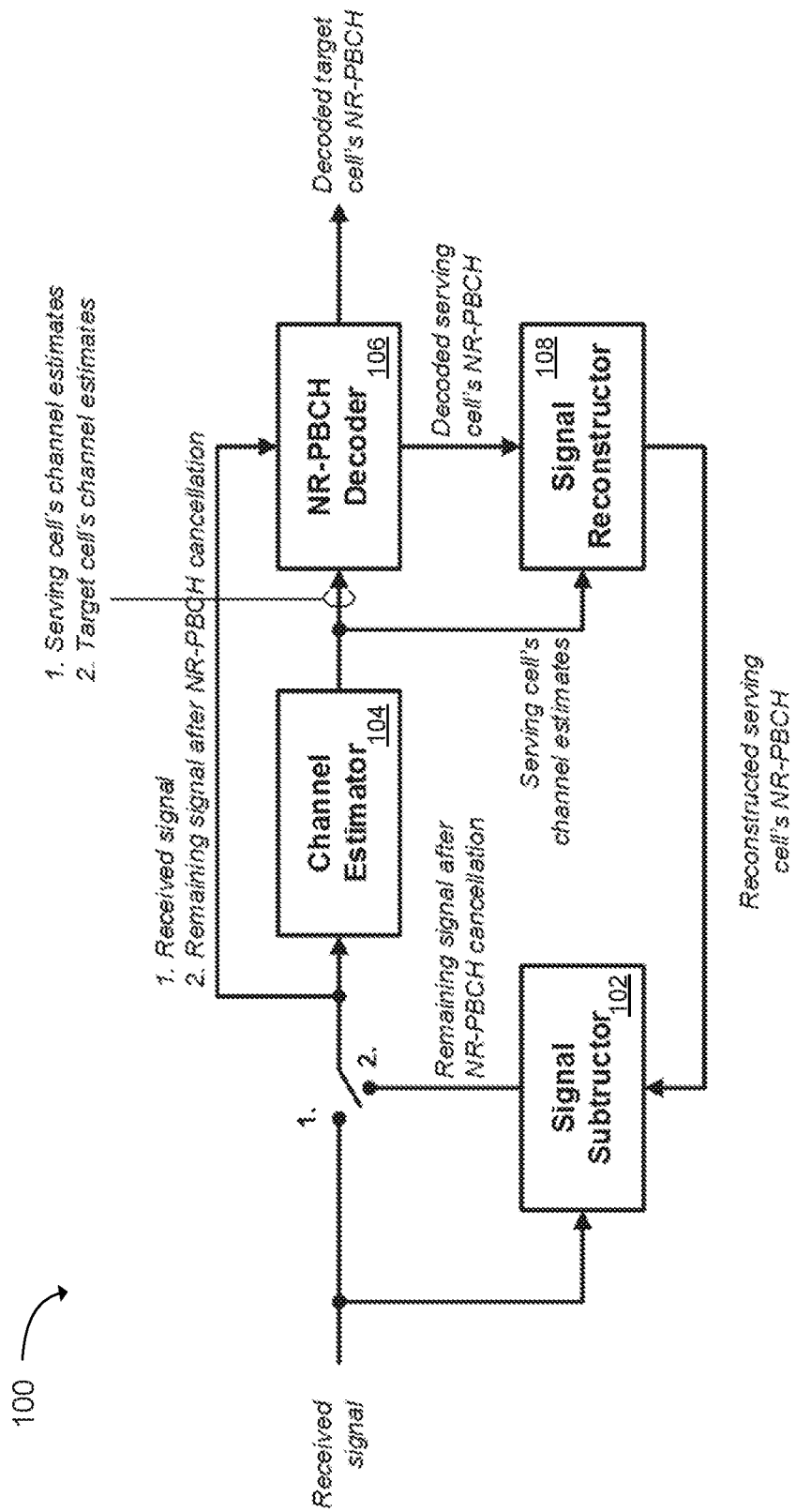
FIG. 1 illustrates an advanced receiver with a physical broadcast channel (PBCH) interference cancellation capability in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Signaling of Physical Broadcast Channel (PBCH)-Demodulation Reference Signal (DMRS) Power Boosting in a New Radio (NR) System In one example, transmit power boosting of reference signals (RS) can be used in cellular communication systems. For example, the transmit power of RS can be boosted to improve a performance of channel estimation or RS detection at a UE. In some cases, it can be beneficial for UEs to know a value of the power boosting that is applied by a transmitting base station (BS), such as a gNB in a New Radio (NR) system. As described in further detail below, the transmitting base station can signal to a UE regarding specific power boosting that is applied in the NR system to demodulation reference signals (DMRS) of a physical broadcast channel (PBCH). In NR systems, this power boosting can be known as a power offset between a PBCH-DMRS and NR-PBCH data resource elements (REs).

In past solutions, three options have been used to handle the power offset between the PBCH-DMRS and the NR-PBCH data REs. In a first option, a fixed power offset was used between the PBCH-DMRS and the NR-PBCH data REs, e.g., 0 decibels (dB). In a second option, a variable power offset was used between the PBCH-DMRS and the NR-PBCH data REs, but the variable offset was not indicated to the UE. In a third option, a variable power offset was selected from a set of possible set of values, but the variable offset was not indicated to the UE.

In one example, knowledge about the power offset (variable or fixed) can be beneficial to advanced receivers (e.g., at the UE) having a PBCH interference cancellation capability. When using the first option, advanced receivers are typically not used for PBCH processing at the UE. However, the network can still apply power boosting, e.g., to implicitly improve PBCH-DMRS detection and/or the UE's channel estimation performance. From the network perspective, the second option may be preferable due to the lack of limitations placed on the gNB, but the second option implies increased signal processing at the UE's advanced receiver in order to estimate an unknown power boosting value, and may not be preferable from the UE perspective. In other words, from the UE perspective, reducing complexity of receive signal processing is desirable. The third option can assume application of power offsets from a limited set of values predefined in the NR specification, but this reduction in complexity is only partial as multiple blind hypothesis testing would still be performed at the UE's advanced receiver.

In the present technology, with regards to PBCH-DMRS power boosting in the NR system, a fourth option can be used, in which a variable power offset between the PBCH-DMRS and the NR-PBCH data REs can be selected from a set of possible values (e.g., at most four values), and the variable power offset can be indicated to the UE in the NR-PBCH. This fourth option can be a compromise between flexibility for the network and complexity of UE implementation. In the fourth option, the network can still select the variable power offset from a limited set of predefined values to boost PBCH-DMRS signals. However, the UE does not have to perform power offset estimation since the boosting value (i.e., the variable power offset) can be signaled from the gNB to the UE in the NR-PBCH. The signaling of the variable power offset in the NR-PBCH can be efficient since the UE already decodes a strong cell's PBCH for further reconstruction and subtraction to perform PBCH interference cancellation. In addition, the set of predefined power boosting values can be limited, so a relatively small number of bits can be used to encode the variable power offset (e.g., 2 bits).

In one example, a UE can read the NR-PBCH of a target cell, which can be different than a serving cell that is associated with the UE. In some cases, the serving cell can be a stronger cell as compared to the target cell, and interference from the serving cell's NR-PBCH transmission can affect an ability of the UE to successfully decode and read the target cell's NR-PBCH. To remedy this issue, the UE can apply advanced receiving techniques with PBCH interference cancellation.

FIG. 1 illustrates an example of an advanced receiver 100 with a physical broadcast channel (PBCH) interference cancellation capability. The advanced receiver 100 can be included, for example, in a UE. The advanced receiver 100 can include a signal subtractor 102, a channel estimator 104, an NR-PBCH decoder 106 and a signal reconstructor 108. The advanced receiver 100 can receive a signal, and the received signal can be sent to the channel estimator 104. The channel estimator 104 can send channel estimates for a serving cell and a target cell to the NR-PBCH decoder 106. The NR-PBCH decoder 106 can send a decoded serving cell's NR-PBCH to the signal reconstructor 108. The channel estimates for the serving cell can also be sent to the signal reconstructor 108. The signal reconstructor 108 can send a reconstructed serving cell's NR-PBCH to the signal subtractor 102. The signal subtractor 102 can send a remaining signal after NR-PBCH cancellation to the channel estimator 104, and then the NR-PBCH decoder 106 can output a decoded target cell's NR-PBCH.

In one example, to cancel the serving cell's NR-PBCH signal from a total received signal, the UE can reconstruct the NR-PBCH transmitted from a wireless propagation channel and subtract the transmitted NR-PBCH from the received signal. As a result, the rest of the signal after subtraction can contain the target cell's NR-PBCH and a small portion of remaining interference plus noise.

In one example, the serving cell's NR-PBCH signal reconstruction can include multiplication of an estimated channel transfer function (CTF) on NR-PBCH REs by a known modulated serving cell's NR-PBCH. The estimation of the CTF itself can be based on the PBCH-DMRS. In the case of a power offset between the PBCH-DMRS and the NR-PBCH, there can be a mismatch between the reconstructed NR-PBCH and actually transmitted NR-PBCH. However, the power offset can be transmitted as part of an NR-PBCH payload, and therefore, can be used by the UE for de-boosting CTF estimates prior to multiplication with the known NR-PBCH. As a result, correct interfering signal reconstruction and successful cancellation can be achieved at the UE without using blind estimation techniques for power boosting.

In one example, the variable power offset signaled in the NR-PBCH from the gNB to the UE can be selected from a limited set of predefined values, which can be useful in restricting a number of bits used to encode the variable power offset value, e.g., 2 bits results in a set of 4 different possible variable power offsets.

Figure 2:
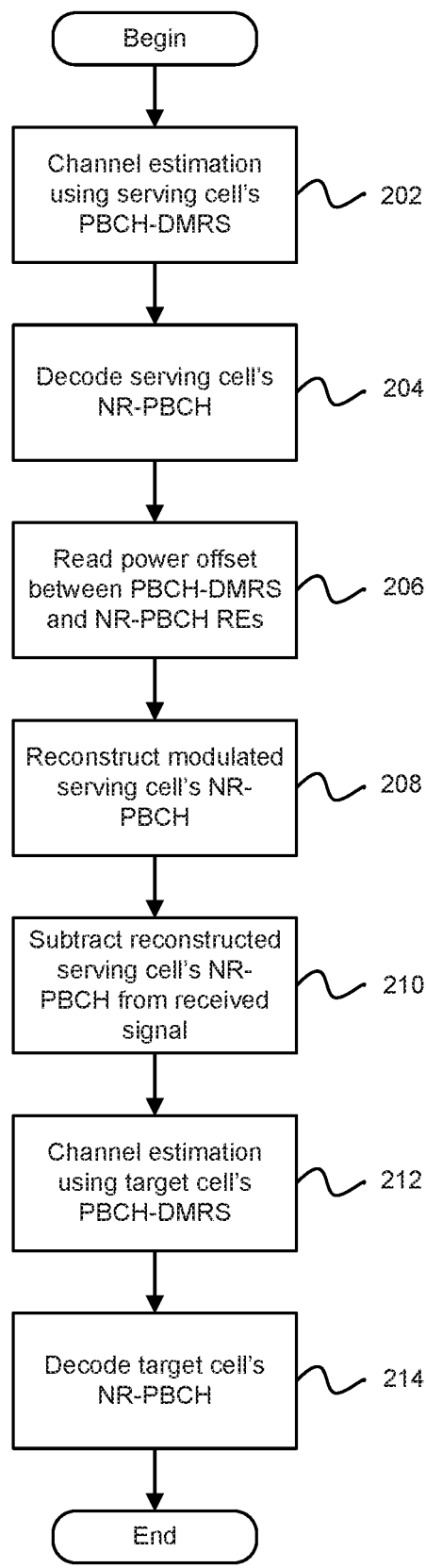
FIG. 2 illustrates a signal processing flow at an advanced receiver of a user equipment (UE) for decoding and reading a target cell's New Radio physical broadcast channel (NR-PBCH) in accordance with an example.

FIG. 2 illustrates an exemplary signal processing flow at an advanced receiver of a UE for receiving (e.g., decoding and reading) a target cell's NR-PBCH. In block 202, the UE can perform a channel estimation using a serving cell's PBCH-DMRS. In block 204, the UE can decode the serving cell's NR-PBCH. In block 206, the UE can read a power offset (i.e., the variable power offset) between the PBCH-DMRS and NR-PBCH REs based on the serving cell's NR-PBCH. In block 208, the UE can reconstruct a modulated serving cell's NR-PBCH using the variable power offset. In block 210, the UE can subtract the reconstructed serving cell's NR-PBCH from a received signal. In block 212, the UE can perform a channel estimation using a target cell's PBCH-DMRS. In block 214, the UE can decode the target cell's NR-PBCH.

In one configuration, a technique is described for power boosting of a PBCH-DMRS, in which an actual power offset value between the PBCH-DMRS and NR-PBCH data REs is signaled from a gNB to a UE as part of a payload of the NR-PBCH. In addition, the power offset value can be selected from a limited set of values predefined in an NR specification.

Transport Block Size (TBS) Design for a New Radio (NR) System

In one configuration, a transport block size (TBS) design can involve a transport block size determination for an NR system. For example, a TBS design for flexible transport block size determination can be based on a hybrid approach of matching a transport block size to a scheduled resource and spectral efficiency, and also allowing an overhead invariant TBS determination.

In one example, in an LTE system, the transport block size can be implicitly indicated in downlink control information (DCI) via a combination of a modulation and coding scheme (MCS) index and resource allocation, and a scaling factor (e.g., a downlink pilot timeslot (DwPTS)). The indication of the transport block size can be performed via a lookup table, specified in 3GPP Technical Specification (TS) 36.213, whose entries are determined using a fixed overhead assumption on available resource elements (REs) per resource block, etc. Some adjustments to TBS determination (e.g., for DwPTS) are also applied when necessitated in the LTE system, including a special handling of combinations that can affect peak data rate.

In an NR system, due to the flexible resource allocation in time and frequency (in granularity of 1 OFDM symbol×12 subcarriers), allowing additional flexibility in a TBS indication can be reasonable to ensure proper matching of the payload according to an intended MCS and available resources.

In one configuration, with respect to a TBS calculation based on resources, an MCS indication in the NR system can be similar to that of the LTE system. For example, the MCS indication in the NR system can indicate a nominal (or intended) spectral efficiency and a modulation order. Then, based on allocated resources, a UE can determine an available number of REs, and then determine a byte-aligned TBS according to the following expression:

$$TBS = 8 \times \left\lfloor \frac{Q_m \times R \times N_{RE} \times N_L}{8} \right\rfloor,$$

wherein $Q_m$ denotes a scheduled modulation order, $R$ denotes an intended code rate, $N_{RE}$ denotes a number of resource elements in the resource allocation on which data can be transmitted, and $N_L$ denotes a number of layers to which the TBS is mapped. Typically, $R \times Q_m$ can denote a spectral efficiency, and $N_{RE}$ can be determined from allocated resources and removing overhead. Assuming a nominal data allocation is a rectangular grid of time-frequency resources (number of OFDM symbols times a number of subcarriers), the overhead(s) that are to be taken into account can include one or more of a demodulation reference signal (DMRS), a sounding reference signal (SRS), guard periods or symbols indicated as "Unknown" via slot format information (SFI), possible physical downlink control channel (PDCCH), secondary synchronization signal (SSS), primary synchronization signal (PSS), physical broadcast channel (PBCH), channel state information reference signal (CSI-RS), and any other overhead explicitly indicated to the UE. The DMRS density itself can be variable depending upon a possible configuration (e.g., front-loaded vs front/back DMRS, different number of antenna ports, presence/absence of tracking reference signal (TRS), etc.).

In one example, the approach described above for the calculation of TBS with respect to NR is different than a TBS calculation approach in LTE. In LTE, a "table-based" approach can be used, in contrast to the NR approach of using a hybrid of a table-based approach (for small TB sizes) and a formula-based approach otherwise. Specifically, in LTE, the UE can use a signaled MCS index to determine a TBS index (I_TBS), and then the UE can use a number of PRB pairs scheduled to look up the TBS value from a table specified in 3GPP TS 36.213. On the other hand, in NR, the UE can count/approximate the number of REs (a reference number of REs), and uses the formula of $$TBS = 8 \times \left\lfloor \frac{Q_m \times R \times N_{RE} \times N_L}{8} \right\rfloor$$

to determine an intermediate TBS value, which can be further quantized to determine a final TBS value. In addition, in NR, a PRB implies 12 subcarriers by 1 symbol, and thus comprises of 12 REs, which is different from LTE. Thus, in NR, the UE can determine the reference number of REs.

In one example, the above expression can be used to indicate the TBS on a first transmission to the UE. For a retransmission, at least three mechanisms are feasible. In a first mechanism, when a gNB necessitates the UE to re-determine a same TBS according to the above expression, then the gNB can arrange an exact same size allocation (e.g., yielding $N_{RE}$) to the UE, which can be feasible for the gNB, but may place some scheduling restrictions, e.g., in cases where the gNB is dynamically varying a slot format. In a second mechanism, when the gNB has a reliable manner (e.g., via acknowledgement/negative acknowledgement (A/N) discontinuous transmission (DTX) detection) of knowing that the UE has determined the TBS from a first transmission, then the gNB can rely on an implicit TBS indication (similar to MCS 29, 30, 31 in LTE). This kind of implicit method for TBS determination can also be used for the case of code block group (CBG)-based transmissions. In a third mechanism, in addition to the two mechanisms described above, the TBS can be derived using a reference formula which allows the gNB to indicate the TBS, which can be somewhat invariant to overhead. For further flexibility, different overheads can be supported. In one example, all of the three mechanisms described above can be considered for TBS indication. For example, a two-bit TBS indicator can be introduced in the DCI to provide the desired flexibility e.g., for slot based indication, the resource allocation can be used in conjunction with the following table.

| Field | Method | Comment |
|---|---|---|
| 00 | Exact REs | % Exact TBS determination |
| 01 | 120 REs/PRB | % Reference overhead 1 |
| 10 | 132 REs/PRB | % Reference overhead 2 |
| 11 | 108 REs/PRB | % Reference overhead 3 |

In one example, when the TBS is determined based on reference overhead assumptions, an additional adjustment factor can be configured based on a time-span (or number of OFDM symbols) of a slot-based allocation. For example, when the slot based allocation occupies only l=7 symbols, the reference overhead (or TBS calculation) can be adjusted by an additional factor (such as 12). In addition, other references can be used instead of 12.

In one example, the TBS determination mechanism can be independently configured for DCI scheduled via different core-sets. For example, a common corset can apply a TBS determination based on a first set of assumptions of reference overhead, and UE-specific core-set 1 can apply a second TBS determination based on a second set of assumptions of reference overhead, and so on.

In one example, when $N_{RB}$ indicates the number of physical resource blocks (PRBs), and l is a number of assigned symbols, and field 01 is indicated in the DCI, the TBS can be calculated using the following:

$$TBS = 8 \times \left\lfloor \frac{Q_m \times R \times N_{RB} \times 120 \times (l/12) \times N_L}{8} \right\rfloor$$

In another example, when $N_{RB}$ indicates the number of PRBs, and l is the number of assigned symbols, and field 00 is indicated in the DCI, the TBS can be calculated by determining an exact number of REs in the resources allocated, and using the formula mentioned earlier (based on $N_{RE}$).

In one configuration, one reference TBS table can be constructed from the MCS (i.e., $Q_m$ and R) and a number of data layers (i.e., $N_L$), while assuming a fixed overhead (e.g., symbols in time domain or REs in time/frequency in one PRB) for control, reference signal and other signals. This single reference MCS table used for TBS determination can be invariant to the signaling overhead due to varied antenna ports (including both DMRS and CSI-RS), the number of CORESETS, the presence of SRS, SS/PBCH blocks and varied slot format, etc.

In one example, to handle the problem of inefficient TBS determination in the case of variable unused REs due to the presence of other signals (as listed above), one or more adjustment factors can be provided to account for the variable REs due to the absence or presence of CORSETS region and/or CSI-RS/DMRS, and/or SS/PBCH blocks, etc. The adjustment factors can at least have a value smaller than 1 to account for the puncturing of other signals. Furthermore, the adjustment factors can also include at least one value greater than 1 to account for the increased number of REs due to slot aggregation or multiple scheduling, and with the assumption that the reference MCS table can be defined based on a single slot transmission.

In one example, more than one adjustment factor can be defined and fixed in the NR specification. For example, different adjustment factors can be defined based on the number of ranks for data transmission. In another example, one adjustment factor can be provided for a DL-only or UL-only slot and one or more adjustment factors can be provided for a hybrid slot consisting of both a DL and UL part in one slot. The adjustment factors can be different for DL and UL due to the different slot structure. In yet another example, one adjustment factor can be provided for the slot containing a SS/PBCH block and one or more adjustment factors can be provided for slots without a SS/PBCH.

In one example, multiple adjustment factors can be defined and one of the adjustment factors can be signaled to the UE using a DCI format. Alternatively, the adjustment factor can be determined by the UE based on a number of data symbols and the presence of other signals (e.g., slot format, DMRS/CSI-RS configuration, PBCH/SS-block) that are pre-known by UE.

In one example, for the case of mini-slots (also termed as non-slot-based or symbol-level scheduling), the reference overheads via scaling may not be sufficient in reflecting the true overheads, and in such cases, a higher layer configuration can be used to define an additional table as follows (e.g., assuming 2-symbol mini-slot and 1/3 DMRS of 1 OFDM symbol).

| Field | Method | Comment |
|-------|--------|---------|
| 00 | Exact REs | % Exact TBS determination |
| 01 | 20 REs | % Reference overhead 1 |
| 10 | 24 REs | % Reference overhead 2 |
| 11 | 12 REs/PRB | % Reference overhead 3 |

In one configuration, for scheduling of smaller packet sizes such as media access control (MAC) payloads and Voice over Internet Protocol (VoIP) payloads, special handling of the TBS indication can be considered. For example, an explicit TBS table can be designed for a certain combination of MCS and resource allocation (RA) combinations (e.g., up to MCS 2 bits per second (bps) and a RA of up to 4 PRBs). In another example, the TBS can be defined for smaller packet sizes, and the TBS can be selected from a set for up to a particular threshold TB size. For example, when an intermediate number of information bits is less than a particular threshold value, TBS values can be selected based on a specified set of values of smaller TB sizes (i.e., a look up table approach).

In one example, another approach for TBS determination can involve defining a TBS grid at least beyond a certain length (e.g., greater than a maximum code block size of 8448), and rounding a calculated number (from formula) to a nearest value in the TBS grid, which can reduce a total number of transport block sizes to be supported, as well as ensure that frequently encountered payloads are prioritized. A "nearest" TBS size determination can be performed using a round operation, ceiling operation, flooring operation or a similar operation. The TBS grid can be defined such that code block segmentation with equal and byte-aligned code block sizes can be supported. The code block sizes can be explicitly defined in the specification, and the TBS grid can be defined to include transport block sizes that satisfy equal sized code blocks. For example, when a maximum code block size is 8448, and a defined code block size set includes {4224, . . . 8448}, then the TBS grid can include values such that after code block segmentation (and TB and cyclic redundancy check (CRC) attachment), a single code block size belonging to a defined code block size set can be yielded, which can enable a low-density parity-check (LDPC) decoder to be optimized for a small set of input sizes.

In one example, another issue to consider is TBS selection for a maximum MCS. In order to avoid multiple variants of the maximum TBS, the UE can be allowed to select the TBS from a certain TBS set that could provide a maximum coding rate below a decoding threshold (e.g., ~0.93 for LDPC), such that the UE can achieve a maximum possible peak data rate regardless of the available REs in a given allocation. Thus, a common TBS pool (not associated with MCS) can be defined, and can be used by the UE to match the target coding rate of the MCS table, although this option necessitates the UE to perform a search in the TBS grid.

In one configuration, in slot aggregation, a transport block can be mapped to multiple slots, which can be analogous to a transmission time interval (TTI) bundling operation in an LTE system. In such a case, the transport block size can be determined based on a single slot allocation, and the other slots can effectively be retransmissions of the same TB. In certain low MCS cases (such as pi/2 binary phase shift keying (BPSK)), the entire aggregated slots can be considered to determine the TBS (similar to a coverage enhancement use case), but for medium to high MCS, such configurations leading to large TBS (due to slot aggregation) are to be avoided. as they can cause undue burden to the UE. In general, a TBS determination assuming mapping to aggregated slots or aggregation of slots and symbols can be subject to certain limits on the MCS and/or frequency domain resource allocation, such that the TBS is not simply scaled up with the number of aggregated slots for the highest possible spectral efficiency.

In one example, some exceptions can be considered to align the maximum TBS supported across different numerologies, while considering differences in the maximum supported allocation bandwidth for different subcarrier spacing (SCS) choices. Specifically, a maximum channel bandwidth (BW) for a SCS of 15 kilohertz (kHz) can be 50 Megahertz (MHz), and for 30 kHz and 60 kHz options, the maximum channel BW can be 100 MHz, while for a SCS of 120 kHz, the maximum channel BW can be 400 MHz. Thus, in case of 120 kHz SCS, the maximum TBS can be derived under the assumptions of highest spectral efficiency and maximum allocated bandwidth for TB mapped to an aggregation of up to two slots. In addition, for 60 kHz SCS, to align the maximum TBS supported across numerologies, the maximum TBS can be derived under the assumptions of highest spectral efficiency and maximum allocated bandwidth for TB mapped to an aggregation of up to two slots. Further, such aggregated slot-based max TBS determination can be only applicable for sub-6 GHz carrier frequencies.

In one configuration, with respect to a LDPC base graph determination, a data channel coding scheme used in an NR system is LDPC, and two base graphs (BG1 and BG2) can be used, each supporting a different range of native code rates and block sizes. For example, BG1 covers rates ~8/9 to ~1/3, and BG2 covers ~2/3 to ~1/5, and BG1 covers information block between ~512 to 8448, and BG2 covers information block sizes between 40 and 2560. For a given transport block size, an appropriate base graph for encoding the given transport block size can be selected accordingly. For example, BG2 can be used for transport block sizes less than or equal to 2560 and an initial transmission code rate less than or equal to 2/3. However, a "rate" can be defined in various manners, e.g., rate can be a nominal rate indicated by the MCS (R×Qm), or the rate can be calculated based on the determined transport block size using the following equation:

$$1/R = \frac{Q_m \times N_{RE} \times N_L}{TBS}.$$

In the above equation, a true rate can be computed using the TBS determination formula, as described earlier.

In one example, while the above expressions include the TBS, some adjustments can be made to reflect additional CRC bits (in the process of code block segmentation of a transport block).

In one example, whether the UE uses a nominal or calculated code rate (for BG determination) can be jointly coded into 2-bits that include the TBS calculation mechanism. Since the mathematical expressions could create some ambiguity, especially if the rate indicated in the MCS is not quantized properly, for such cases, the rate definition can follow a 10-bit precision explicitly specified in the specification as part of the MCS definition. In addition, in certain cases, the network can explicitly configure some limits on BG2 usage, based on a restricted subset of MCS levels and/or resource allocation in time and resource allocation in frequency domain.

In one configuration, with respect to a quantized TBS design, typically for a given TBS, the values of $Q_m$ can belong to {1,2,4,6,8,10, etc.} which correspond to the modulation order, and the number of layers can be {1,2,3,4, etc.}, and a rate R can be defined in terms of a quantized numerator and denominator, e.g., R=m/n, where both m and n are integers. For example, n can be a power of two (e.g., 1024), which can allow for a straightforward implementation for TBS determination. Then the number of REs ($N_{REs}$) can typically depend on the number of REs assigned in the slot for that TB, and the maximum number of REs (not considering the DMRS, or control signaling) can be as large as 14*3300=46200, etc. In addition, there can be restrictions from the code block segmentation that may also be used to determine the appropriate TBS value. In particular, when the TB becomes segmented into multiple code blocks with code block sizes having equal length, with code block (CB) CRC and transport block (TB) CRC attached, then the relationship between TBS and CB size ($K_{CB}$) is as follows:

TBS+$(C+1)*L_{CRC}=C*K_{CB}$, wherein $L_{CRC}$ is a CRC length for TB-level and CB-level, $K_{CB}$ is the CB size, and $C$ is a number of code block segments.

In another example, when the supported code block sizes allowed are further restricted (e.g., KCB) to some structure (e.g., only multiples of 8 or only a subset of byte-aligned values), the set of supported TB sizes can be restricted based on the following:

TBS+$(C+1)*L_{CRC}=C*8*X$, wherein $8*X=K_{CB}$, and $X$ is a positive integer.

Figure 3:
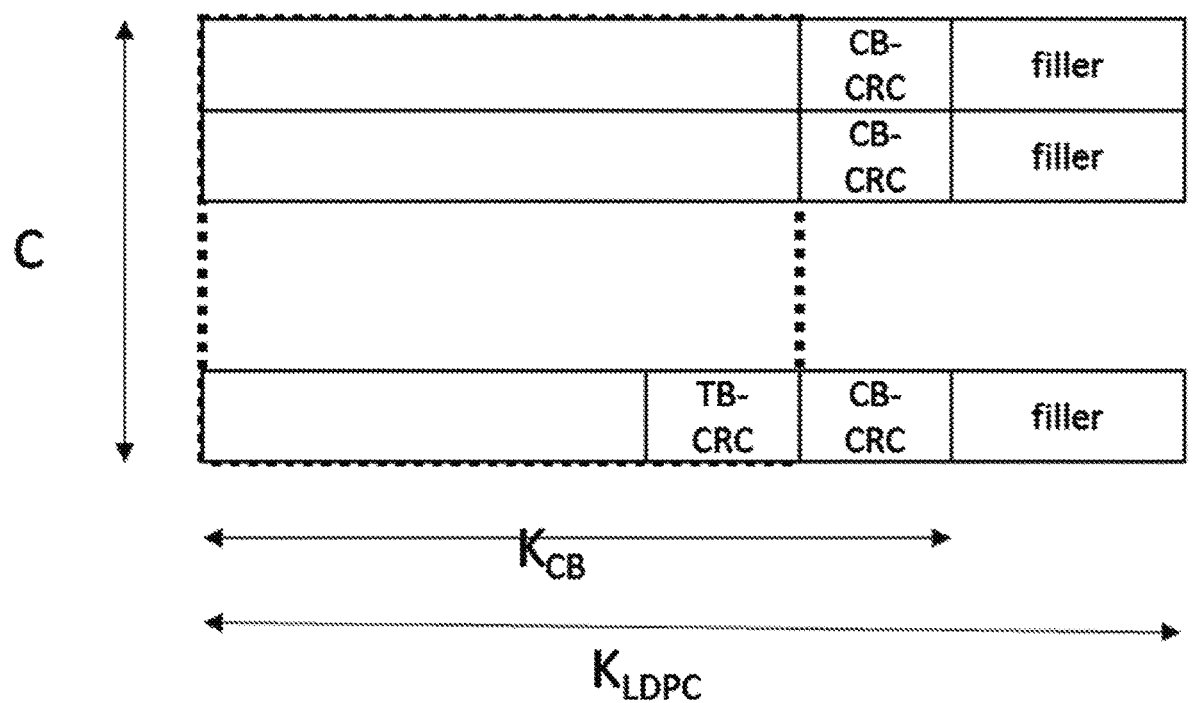
FIG. 3 illustrates a plurality of code block segments in accordance with an example.

FIG. 3 illustrates an example of a plurality of code block segments (C). The code block segments can include transport block (TB) cyclic redundancy checks (CRC) and code block (CB) CRC. A CB size ($K_{CB}$) of the code block segments can include the TB-CRC and the CB-CRC. In addition, a LDPC size ($K_{LDPC}$) of the code block segments can include the TB-CRC, the CB-CRC and filler. In other words, the LDPC size ($K_{LDPC}$) can include the CB size ($K_{CB}$) in addition to the filter.

In one configuration, with respect to a quantized number of resource elements, an actual number of REs (G) can be determined from assigned resources, which can be determined based on a number of PRBs, a number of time-domain allocation, a DMRS assigned in the slot, possible CSI-RS, possible SRS, etc. Then the UE can determine a reference number of REs (H) by quantizing the actual number of REs (G), based on one or more of physical layer signaling, MAC or higher layer signaling (RRC), or a pre-determined rule in the specification. For example, H can be determined as follows: (1) determining A=G/$N_{PRBs}$, where $N_{PRBs}$ is the number physical resource blocks assigned to the UE; and (2) determining a nearest number of reference REs/PRB from a set (e.g., {120, 132, 144, 152}), for example, finding the smallest value from the set that is no larger than A, and using that reference number of REs/PRB as the reference number of REs (H) for determining the TBS. In one example, the set itself can be determined from one or more sets indicated by higher layer and/or physical layer signaling. For example, multiple sets can be defined by higher layers, and the physical layer DCI can indicate explicitly or implicitly the set to apply for a particular TB. Then, the TBS can be determined by finding the closest match to the formula, as described previously.

FIG. 4 is an example of a table of values for numbers of resource elements (NREs) based on different values of NREs per physical resource block (PRB) (or NREs/PRB) and a number of PRBs (NRBs). In one example, the TBS determination can further include determining a reference number of PRBs from an indicated set of resources (G) and a reference number of REs (e.g., indicated in DCI (120)). In another example, the reference number of REs/PRB can be indicated in the DCI, and can be determined from one or more sets indicated by higher layer and/or physical layer signaling. For example, multiple sets can be defined by higher layers, and the physical layer DCI can indicate explicitly or implicitly the set to apply for a particular TB.

In one configuration, a technique for determining a transport block size can be defined. The technique can involve acquiring information regarding a first number of assigned resource elements (REs) for a transport block in one or more symbols based on one or more of downlink control information and higher layer signaling. The technique can involve determining a reference number of REs per physical resource block (PRB) based on the first number of assigned REs, and at least a reference number of PRBs for the transport block. The technique can involve determining a transport block size based on at least the reference number of REs per PRB and the reference number of PRBs. The technique can involve transmitting a transport block in accordance with the determined transport block size.

In one example, the transport block size can yield a single code block size for all code blocks of a TBS, when code block segmentation is applied to the TBS. In another example, the single code block size can be a multiple of 8, where a CRC can be attached for the transport block and code block during code block segmentation. In yet another example, a reference number of PRBs can be equal to a number of PRBs assigned in the control information, the reference number of PRBs can be not equal to the number of PRBs assigned in the control information, or the reference number of PRBs can be smaller than or larger than the number of PRBs assigned in the control information. In addition, all transport block sizes can be derived such that the code block size for each transport block is a multiple of 8, where a CRC can be attached for the transport block and code block during code block segmentation.

Figure 5:
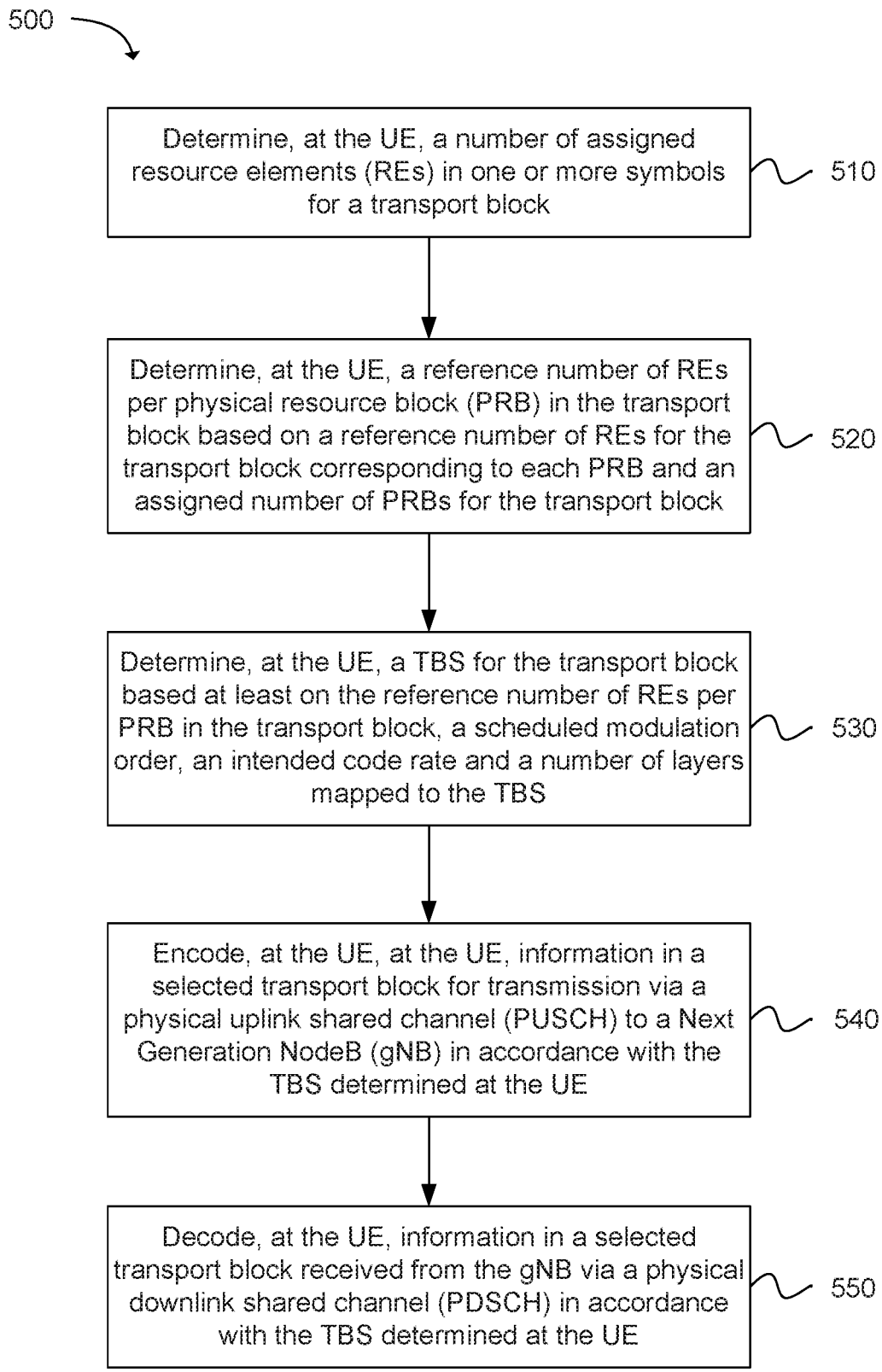
FIG. 5 depicts functionality of a user equipment (UE) operable to determine a transport block size (TBS) in accordance with an example.

Another example provides functionality 500 of a user equipment (UE) operable to determine a transport block size (TBS), as shown in FIG. 5. The UE can comprise one or more processors configured to determine, at the UE, a number of assigned resource elements (REs) in one or more symbols for a transport block, as in block 510. The UE can comprise one or more processors configured to determine, at the UE, a reference number of REs per physical resource block (PRB) in the transport block based on a reference number of REs for the transport block corresponding to each PRB and an assigned number of PRBs for the transport block, as in block 520. The UE can comprise one or more processors configured to determine, at the UE, a TBS for the transport block based at least on the reference number of REs per PRB in the transport block, a scheduled modulation order, an intended code rate and a number of layers mapped to the TBS, as in block 530. The UE can comprise one or more processors configured to encode, at the UE, information in a selected transport block for transmission via a physical uplink shared channel (PUSCH) to a Next Generation NodeB (gNB) in accordance with the TBS determined at the UE, as in block 540. The UE can comprise one or more processors configured to decode, at the UE, information in a selected transport block received from the gNB via a physical downlink shared channel (PDSCH) in accordance with the TBS determined at the UE, as in block 550. In addition, the UE can comprise a memory interface configured to send to a memory an indication of the TBS.

Figure 6:
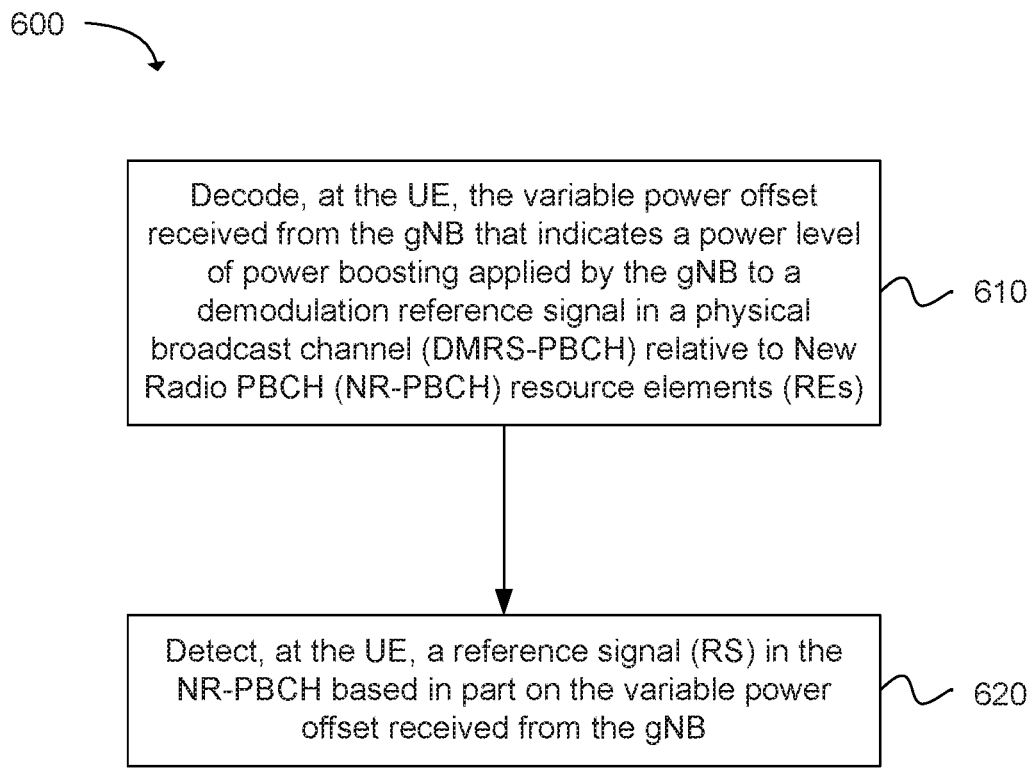
FIG. 6 depicts functionality of a user equipment (UE) operable to decode a variable power offset received from a Next Generation NodeB (gNB) in accordance with an example.

Another example provides functionality 600 of a UE operable to decode a variable power offset received from a Next Generation NodeB (gNB), as shown in FIG. 6. The UE can comprise one or more processors configured to decode, at the UE, the variable power offset received from the gNB that indicates a power level of power boosting applied by the gNB to a demodulation reference signal in a physical broadcast channel (DMRS-PBCH) relative to New Radio PBCH (NR-PBCH) resource elements (REs), as in block 610. The UE can comprise one or more processors configured to detect, at the UE, a reference signal (RS) in the NR-PBCH based in part on the variable power offset received from the gNB, as in block 620. In addition, the UE can comprise a memory interface configured to send to a memory an indication of the variable power offset.

Figure 7:
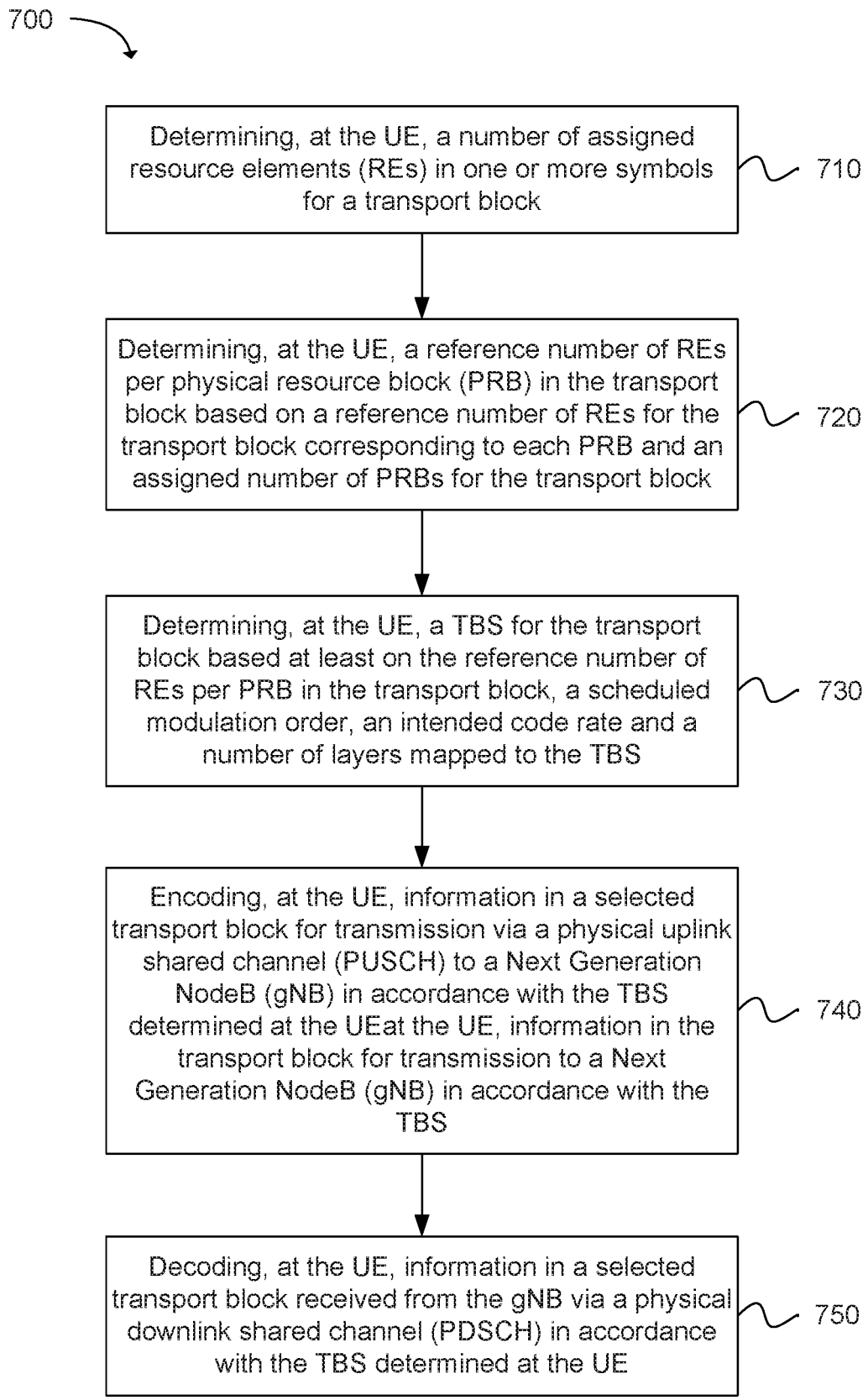
FIG. 7 depicts a flowchart of a machine readable storage medium having instructions embodied thereon for determining a transport block size (TBS) at a user equipment (UE) in accordance with an example.

Another example provides at least one machine readable storage medium having instructions 700 embodied thereon for determining a transport block size (TBS) at a user equipment (UE), as shown in FIG. 7. The instructions can be executed on a machine, where the instructions are included on at least one computer readable medium or one non-transitory machine readable storage medium. The instructions when executed by one or more processors of the UE perform: determining, at the UE, a number of assigned resource elements (REs) in one or more symbols for a transport block, as in block 710. The instructions when executed by one or more processors of the UE perform: determining, at the UE, a reference number of REs per physical resource block (PRB) in the transport block based on a reference number of REs for the transport block corresponding to each PRB and an assigned number of PRBs for the transport block, as in block 720. The instructions when executed by one or more processors of the UE perform: determining, at the UE, a TBS for the transport block based at least on the reference number of REs per PRB in the transport block, a scheduled modulation order, an intended code rate and a number of layers mapped to the TBS, as in block 730. The instructions when executed by one or more processors of the UE perform: encoding, at the UE, information in a selected transport block for transmission via a physical uplink shared channel (PUSCH) to a Next Generation NodeB (gNB) in accordance with the TBS determined at the UE, as in block 740. The instructions when executed by one or more processors of the UE perform: decoding, at the UE, information in a selected transport block received from the gNB via a physical downlink shared channel (PDSCH) in accordance with the TBS determined at the UE, as in block 750.

Figure 8:
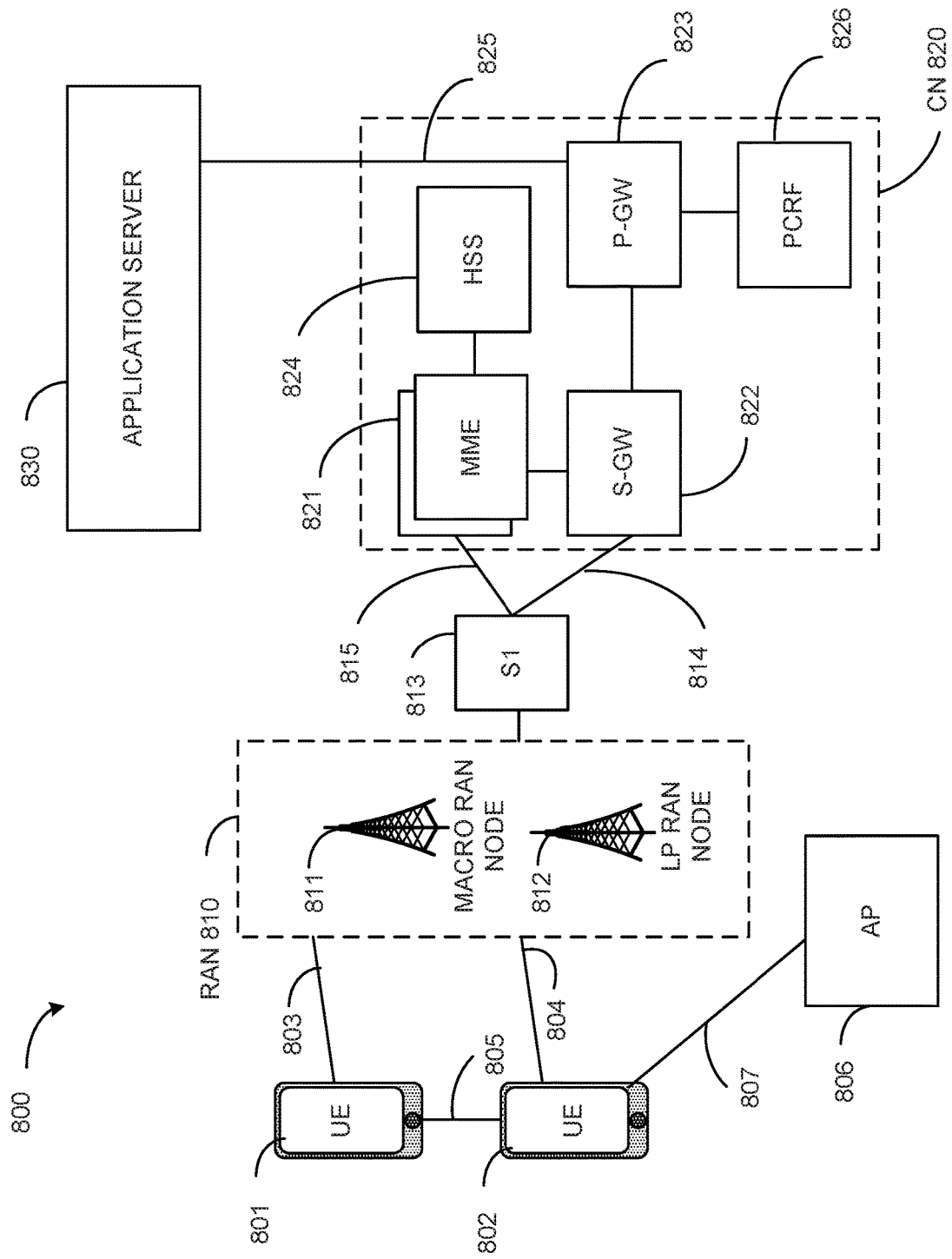
FIG. 8 illustrates an architecture of a wireless network in accordance with an example.

FIG. 8 illustrates an architecture of a system 800 of a network in accordance with some embodiments. The system 800 is shown to include a user equipment (UE) 801 and a UE 802. The UEs 801 and 802 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 801 and 802 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 801 and 802 may be configured to connect, e.g., communicatively couple, with a radio access network (RAN) 810—the RAN 810 may be, for example, an Evolved Universal Mobile Telecommunications System (UMTS) Terrestrial Radio Access Network (E-UTRAN), a NextGen RAN (NG RAN), or some other type of RAN. The UEs 801 and 802 utilize connections 803 and 804, respectively, each of which comprises a physical communications interface or layer (discussed in further detail below); in this example, the connections 803 and 804 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 801 and 802 may further directly exchange communication data via a ProSe interface 805. The ProSe interface 805 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 802 is shown to be configured to access an access point (AP) 806 via connection 807. The connection 807 can comprise a local wireless connection, such as a connection consistent with any IEEE 902.15 protocol, wherein the AP 806 would comprise a wireless fidelity (WiFi®) router. In this example, the AP 806 is shown to be connected to the Internet without connecting to the core network of the wireless system (described in further detail below).

The RAN 810 can include one or more access nodes that enable the connections 803 and 804. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 810 may include one or more RAN nodes for providing macrocells, e.g., macro RAN node 811, and one or more RAN nodes for providing femtocells or picocells (e.g., cells having smaller coverage areas, smaller user capacity, or higher bandwidth compared to macrocells), e.g., low power (LP) RAN node 812.

Any of the RAN nodes 811 and 812 can terminate the air interface protocol and can be the first point of contact for the UEs 801 and 802. In some embodiments, any of the RAN nodes 811 and 812 can fulfill various logical functions for the RAN 810 including, but not limited to, radio network controller (RNC) functions such as radio bearer management, uplink and downlink dynamic radio resource management and data packet scheduling, and mobility management.

In accordance with some embodiments, the UEs 801 and 802 can be configured to communicate using Orthogonal Frequency-Division Multiplexing (OFDM) communication signals with each other or with any of the RAN nodes 811 and 812 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 811 and 812 to the UEs 801 and 802, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 801 and 802. The physical downlink control channel (PDCCH) may carry information about the transport format and resource allocations related to the PDSCH channel, among other things. It may also inform the UEs 801 and 802 about the transport format, resource allocation, and H-ARQ (Hybrid Automatic Repeat Request) information related to the uplink shared channel. Typically, downlink scheduling (assigning control and shared channel resource blocks to the UE 802 within a cell) may be performed at any of the RAN nodes 811 and 812 based on channel quality information fed back from any of the UEs 801 and 802. The downlink resource assignment information may be sent on the PDCCH used for (e.g., assigned to) each of the UEs 801 and 802.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 9).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 810 is shown to be communicatively coupled to a core network (CN) 820—via an S1 interface 813. In embodiments, the CN 820 may be an evolved packet core (EPC) network, a NextGen Packet Core (NPC) network, or some other type of CN. In this embodiment the S1 interface 813 is split into two parts: the S1-U interface 814, which carries traffic data between the RAN nodes 811 and 812 and the serving gateway (S-GW) 822, and the S1-mobility management entity (MME) interface 815, which is a signaling interface between the RAN nodes 811 and 812 and MMEs 821.

In this embodiment, the CN 820 comprises the MMEs 821, the S-GW 822, the Packet Data Network (PDN) Gateway (P-GW) 823, and a home subscriber server (HSS) 824. The MMEs 821 may be similar in function to the control plane of legacy Serving General Packet Radio Service (GPRS) Support Nodes (SGSN). The MMEs 821 may manage mobility aspects in access such as gateway selection and tracking area list management. The HSS 824 may comprise a database for network users, including subscription-related information to support the network entities' handling of communication sessions. The CN 820 may comprise one or several HSSs 824, depending on the number of mobile subscribers, on the capacity of the equipment, on the organization of the network, etc. For example, the HSS 824 can provide support for routing/roaming, authentication, authorization, naming/addressing resolution, location dependencies, etc.

The S-GW 822 may terminate the S1 interface 813 towards the RAN 810, and routes data packets between the RAN 810 and the CN 820. In addition, the S-GW 822 may be a local mobility anchor point for inter-RAN node handovers and also may provide an anchor for inter-3GPP mobility. Other responsibilities may include lawful intercept, charging, and some policy enforcement.

The P-GW 823 may terminate an SGi interface toward a PDN. The P-GW 823 may route data packets between the EPC network 823 and external networks such as a network including the application server 830 (alternatively referred to as application function (AF)) via an Internet Protocol (IP) interface 825. Generally, the application server 830 may be an element offering applications that use IP bearer resources with the core network (e.g., UMTS Packet Services (PS) domain, LTE PS data services, etc.). In this embodiment, the P-GW 823 is shown to be communicatively coupled to an application server 830 via an IP communications interface 825. The application server 830 can also be configured to support one or more communication services (e.g., Voice-over-Internet Protocol (VoIP) sessions, PTT sessions, group communication sessions, social networking services, etc.) for the UEs 801 and 802 via the CN 820.

The P-GW 823 may further be a node for policy enforcement and charging data collection. Policy and Charging Enforcement Function (PCRF) 826 is the policy and charging control element of the CN 820. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 826 may be communicatively coupled to the application server 830 via the P-GW 823. The application server 830 may signal the PCRF 826 to indicate a new service flow and select the appropriate Quality of Service (QoS) and charging parameters. The PCRF 826 may provision this rule into a Policy and Charging Enforcement Function (PCEF) (not shown) with the appropriate traffic flow template (TFT) and QoS class of identifier (QCI), which commences the QoS and charging as specified by the application server 830.

Figure 9:
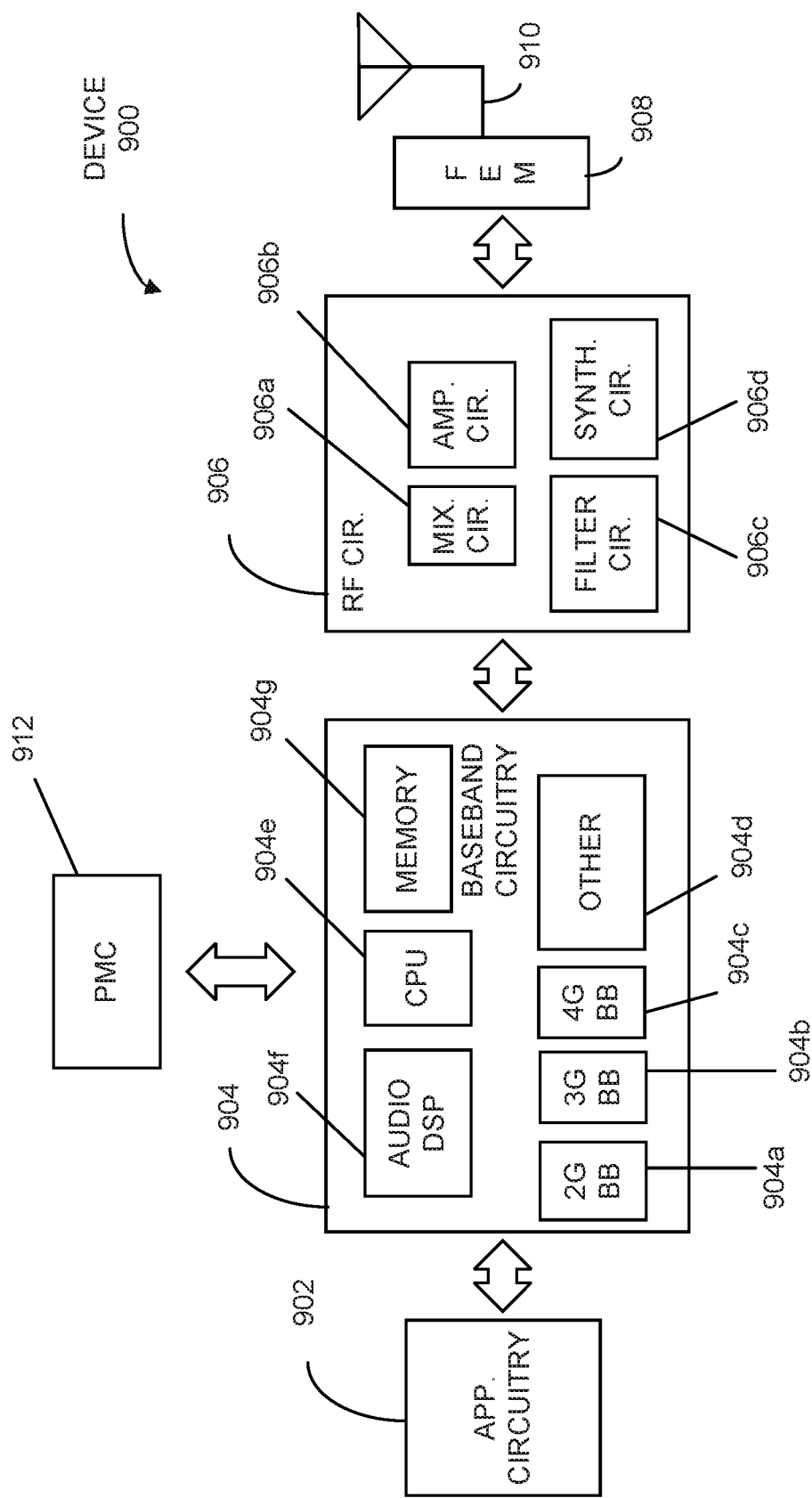
FIG. 9 illustrates a diagram of a wireless device (e.g., UE) in accordance with an example.

FIG. 9 illustrates example components of a device 900 in accordance with some embodiments. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some embodiments, the baseband circuitry 904 may include a third generation (3G) baseband processor 904a, a fourth generation (4G) baseband processor 904b, a fifth generation (5G) baseband processor 904c, or other baseband processor(s) 904*d* for other existing generations, generations in development or to be developed in the future (e.g., second generation (2G), sixth generation (6G), etc.). The baseband circuitry 904 (e.g., one or more of baseband processors 904*a-d*) may handle various radio control functions that enable communication with one or more radio networks via the RF circuitry 906. In other embodiments, some or all of the functionality of baseband processors 904*a-d* may be included in modules stored in the memory 904*g* and executed via a Central Processing Unit (CPU) 904*e*. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904*f*. The audio DSP(s) 904*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906*a*, amplifier circuitry 906*b* and filter circuitry 906*c*. In some embodiments, the transmit signal path of the RF circuitry 906 may include filter circuitry 906*c* and mixer circuitry 906*a*. RF circuitry 906 may also include synthesizer circuitry 906*d* for synthesizing a frequency for use by the mixer circuitry 906*a* of the receive signal path and the transmit signal path. In some embodiments, the mixer circuitry 906*a* of the receive signal path may be configured to down-convert RF signals received from the FEM circuitry 908 based on the synthesized frequency provided by synthesizer circuitry 906*d*. The amplifier circuitry 906*b* may be configured to amplify the down-converted signals and the filter circuitry 906*c* may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a necessity. In some embodiments, mixer circuitry 906*a* of the receive signal path may comprise passive mixers, although the scope of the embodiments is not limited in this respect.

In some embodiments, the mixer circuitry 906*a* of the transmit signal path may be configured to up-convert input baseband signals based on the synthesized frequency provided by the synthesizer circuitry 906*d* to generate RF output signals for the FEM circuitry 908. The baseband signals may be provided by the baseband circuitry 904 and may be filtered by filter circuitry 906*c*.

In some embodiments, the mixer circuitry 906*a* of the receive signal path and the mixer circuitry 906*a* of the transmit signal path may include two or more mixers and may be arranged for quadrature downconversion and upconversion, respectively. In some embodiments, the mixer circuitry 906*a* of the receive signal path and the mixer circuitry 906*a* of the transmit signal path may include two or more mixers and may be arranged for image rejection (e.g., Hartley image rejection). In some embodiments, the mixer circuitry 906*a* of the receive signal path and the mixer circuitry 906*a* may be arranged for direct downconversion and direct upconversion, respectively. In some embodiments, the mixer circuitry 906*a* of the receive signal path and the mixer circuitry 906*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906*d* may be a fractional-N synthesizer or a fractional N/N+1 synthesizer, although the scope of the embodiments is not limited in this respect as other types of frequency synthesizers may be suitable. For example, synthesizer circuitry 906*d* may be a delta-sigma synthesizer, a frequency multiplier, or a synthesizer comprising a phase-locked loop with a frequency divider.

The synthesizer circuitry 906*d* may be configured to synthesize an output frequency for use by the mixer circuitry 906*a* of the RF circuitry 906 based on a frequency input and a divider control input. In some embodiments, the synthesizer circuitry 906*d* may be a fractional N/N+1 synthesizer.

In some embodiments, frequency input may be provided by a voltage controlled oscillator (VCO), although that is not a necessity. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 9 12 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
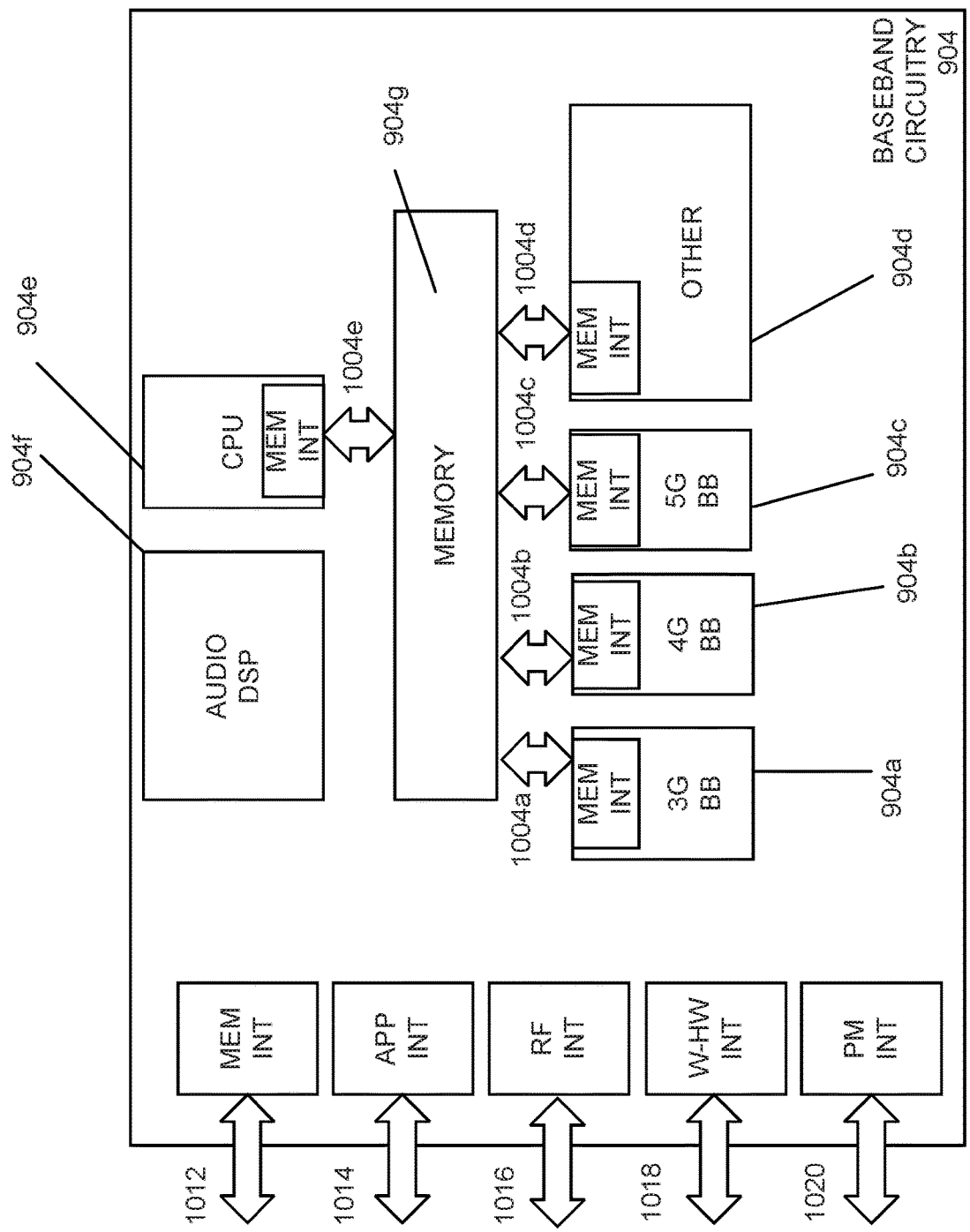
FIG. 10 illustrates interfaces of baseband circuitry in accordance with an example.

FIG. 10 illustrates example interfaces of baseband circuitry in accordance with some embodiments. As discussed above, the baseband circuitry 904 of FIG. 9 may comprise processors 904a-904e and a memory 904g utilized by said processors. Each of the processors 904a-904e may include a memory interface, 904a-904e, respectively, to send/receive data to/from the memory 904g.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

Figure 11:
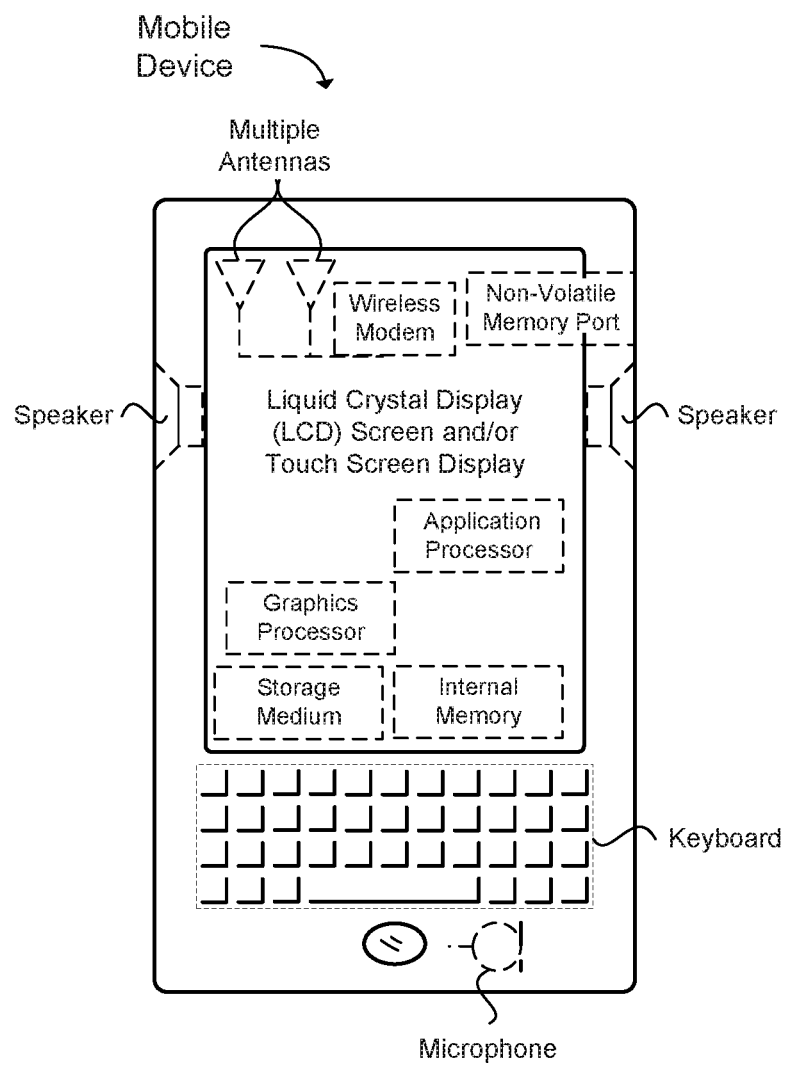
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to determine a transport block size (TBS), the apparatus comprising: one or more processors configured to: determine, at the UE, a number of assigned resource elements (REs) in one or more symbols for a transport block; determine, at the UE, a reference number of REs per physical resource block (PRB) in the transport block based on a reference number of REs for the transport block corresponding to each PRB and an assigned number of PRBs for the transport block; determine, at the UE, a TBS for the transport block based at least on the reference number of REs per PRB in the transport block, a scheduled modulation order, an intended code rate and a number of layers mapped to the TBS; encode, at the UE, information in a selected transport block for transmission via a physical uplink shared channel (PUSCH) to a Next Generation NodeB (gNB) in accordance with the TBS determined at the UE; and decode, at the UE, information in a selected transport block received from the gNB via a physical downlink shared channel (PDSCH) in accordance with the TBS determined at the UE; and a memory interface configured to send to a memory an indication of the TBS.

Example 2 includes the apparatus of Example 1, further comprising a transceiver configured to: transmit the selected transport block via the PUSCH to the gNB in accordance with the TBS determined at the UE; and receive the selected transport block via the PDSCH from the gNB in accordance with the TBS determined at the UE.

Example 3 includes the apparatus of any of Examples 1 to 2, wherein the one or more processors are configured to determine a number of bits associated with the TBS, wherein the number of bits is equal to $Q_m \times R \times N_{RE} \times N_L$, wherein $N_{RE}$ represents the number of assigned REs, $Q_m$ represents the scheduled modulation order from a modulation and coding scheme (MCS), R represents the intended code rate from the MCS, and $N_L$ represents the number of layers mapped to the TBS.

Example 4 includes the apparatus of any of Examples 1 to 3, wherein the one or more processors are configured to: adjust the number of assigned REs in the transport block based on an overhead adjustment factor that accounts for a variable number of unused REs due to a presence of other signals, wherein the overhead adjustment factor is separately configured for TBS determination for the PDSCH and the PUSCH; and determine the reference number of REs by quantizing the number of assigned REs based on the overhead adjustment factor that is indicated to the UE using one or more of physical layer signaling, medium access control (MAC) signaling, radio resource control (RRC) signaling or a predetermined rule.

Example 5 includes the apparatus of any of Examples 1 to 4, wherein the one or more processors are configured to apply code block segmentation to the TBS to provide a single code block size for all code blocks of the TBS.

Example 6 includes the apparatus of any of Examples 1 to 5, wherein the one or more processors are configured to attach a cyclic redundancy check (CRC) for the transport block and a code block when the code block segmentation is applied to the TBS, wherein the single code block size is a multiple of 8.

Example 7 includes the apparatus of any of Examples 1 to 6, wherein the one or more processors are configured to determine the number of assigned REs based on downlink control information or higher layer signaling received from the gNB.

Example 8 includes the apparatus of any of Examples 1 to 7, wherein: the reference number of PRBs is equal to a number of PRBs assigned in control information; or the TBS is defined for reduced packet sizes, and the TBS is selected from a specified set of values of reduced TB sizes and for up to a particular threshold TB size.

Example 9 includes the apparatus of any of Examples 1 to 8, wherein the one or more processors are configured to derive all TBSs such that a code block size for each transport block is a multiple of 8, wherein a cyclic redundancy check (CRC) is attached for the transport block and a code block when code block segmentation is applied to the TBS.

Example 10 includes the apparatus of any of Examples 1 to 9, wherein the one or more processors are configured to determine the TBS based on a single slot allocation when configured with slot aggregation for the PDSCH or the PUSCH, and other slots are retransmissions of a same transport block.

Example 11 includes the apparatus of any of Examples 1 to 10, wherein the one or more processors are configured to determine the number of assigned REs using one or more of: a number of PRBs, a time domain allocation, a demodulation reference signal assigned in a slot, a channel state information reference signal (CSI-RS) or a sounding reference signal (SRS).

Example 12 includes an apparatus of a user equipment (UE) operable to decode a variable power offset received from a Next Generation NodeB (gNB), the apparatus comprising: one or more processors configured to: decode, at the UE, the variable power offset received from the gNB that indicates a power level of power boosting applied by the gNB to a demodulation reference signal in a physical broadcast channel (DMRS-PBCH) relative to New Radio PBCH (NR-PBCH) resource elements (REs); and detect, at the UE, a reference signal (RS) in the NR-PBCH based in part on the variable power offset received from the gNB; and a memory interface configured to send to a memory an indication of the variable power offset.

Example 13 includes the apparatus of Example 12, further comprising a transceiver configured to receive the variable power offset from the gNB.

Example 14 includes the apparatus of any of Examples 12 to 13, wherein the one or more processors are configured to decode the variable power offset received from the gNB via the NR-PBCH.

Example 15 includes the apparatus of any of Examples 12 to 14, wherein the variable power offset is selected from a limited set of possible variable power offset values.

Example 16 includes the apparatus of any of Examples 12 to 15, wherein the variable power offset is a two-bit value, and the variable power offset is selected from four possible variable power offset values.

Example 17 includes the apparatus of any of Examples 12 to 16, wherein the one or more processors are configured to: decode an NR-PBCH of a serving cell; determine the variable power offset between the PBCH-DMRS and the NR-PBCH REs; determine a reconstructed NR-PBCH of the serving cell based on the variable power offset; subtract the reconstructed NR-PBCH of the serving cell from a received signal at the UE to determine a NR-PBCH of a target cell; perform a channel estimation using a PBCH-DMRS of the target cell; and decode the NR-PBCH of the target cell based on the channel estimation.

Example 18 includes at least one non-transitory machine readable storage medium having instructions embodied thereon for determining a transport block size (TBS) at a user equipment (UE), the instructions when executed by one or more processors at the UE perform the following: determining, at the UE, a number of assigned resource elements (REs) in one or more symbols for a transport block; determining, at the UE, a reference number of REs per physical resource block (PRB) in the transport block based on a reference number of REs for the transport block corresponding to each PRB and an assigned number of PRBs for the transport block; determining, at the UE, a TBS for the transport block based at least on the reference number of REs per PRB in the transport block, a scheduled modulation order, an intended code rate and a number of layers mapped to the TBS; encoding, at the UE, information in a selected transport block for transmission via a physical uplink shared channel (PUSCH) to a Next Generation NodeB (gNB) in accordance with the TBS determined at the UE; and decoding, at the UE, information in a selected transport block received from the gNB via a physical downlink shared channel (PDSCH) in accordance with the TBS determined at the UE.

Example 19 includes the at least one non-transitory machine readable storage medium of Example 18, further comprising instructions when executed perform the following: determining a number of bits associated with the TBS, wherein the number of bits is equal to $Q_m \times R \times N_{RE} \times N_L$, wherein $N_{RE}$ represents the number of assigned REs, $Q_m$ represents the scheduled modulation order from a modulation and coding scheme (MCS), R represents the intended code rate from the MCS, and $N_L$ represents the number of layers mapped to the TBS.

Example 20 includes the at least one non-transitory machine readable storage medium of any of Examples 18 to 19, further comprising instructions when executed perform the following: adjusting the number of assigned REs in the transport block based on an overhead adjustment factor that accounts for a variable number of unused REs due to a presence of other signals, wherein the overhead adjustment factor is separately configured for TBS determination for the PDSCH and the PUSCH; and determining the reference number of REs by quantizing the number of assigned REs based on the overhead adjustment factor that is indicated to the UE using one or more of physical layer signaling, medium access control (MAC) signaling, radio resource control (RRC) signaling or a predetermined rule.

Example 21 includes the at least one non-transitory machine readable storage medium of any of Examples 18 to 20, further comprising instructions when executed perform the following: applying code block segmentation to the TBS to provide a single code block size for all code blocks of the TBS; and attaching a cyclic redundancy check (CRC) for the transport block and a code block when the code block segmentation is applied to the TBS, wherein the single code block size is a multiple of 8.

Example 22 includes the at least one non-transitory machine readable storage medium of any of Examples 18 to 21, further comprising instructions when executed perform the following: determining the number of assigned REs based on downlink control information or higher layer signaling received from the gNB.

Example 23 includes the at least one non-transitory machine readable storage medium of any of Examples 18 to 22, wherein: the reference number of PRBs is equal to a number of PRBs assigned in control information; or the TBS is defined for reduced packet sizes, and the TBS is selected from a specified set of values of reduced TB sizes and for up to a particular threshold TB size.

Example 24 includes the at least one non-transitory machine readable storage medium of any of Examples 18 to 23, further comprising instructions when executed perform the following: deriving all TBSs such that a code block size for each transport block is a multiple of 8, wherein a cyclic redundancy check (CRC) is attached for the transport block and a code block when code block segmentation is applied to the TBS.

Example 25 includes the at least one non-transitory machine readable storage medium of any of Examples 18 to 24, further comprising instructions when executed perform the following: determining the TBS based on a single slot allocation when configured with slot aggregation for the PDSCH or the PUSCH, and other slots are retransmissions of a same transport block.

Example 26 includes the at least one non-transitory machine readable storage medium of any of Examples 18 to 25, further comprising instructions when executed perform the following: determining the number of assigned REs using one or more of: a number of PRBs, a time domain allocation, a demodulation reference signal assigned in a slot, a channel state information reference signal (CSI-RS) or a sounding reference signal (SRS).

Example 27 includes a user equipment (UE) operable to determine a transport block size (TBS), the UE comprising: means for determining, at the UE, a number of assigned resource elements (REs) in one or more symbols for a transport block; means for determining, at the UE, a reference number of REs per physical resource block (PRB) in the transport block based on a reference number of REs for the transport block corresponding to each PRB and an assigned number of PRBs for the transport block; means for determining, at the UE, a TBS for the transport block based at least on the reference number of REs per PRB in the transport block, a scheduled modulation order, an intended code rate and a number of layers mapped to the TBS; means for encoding, at the UE, information in a selected transport block for transmission via a physical uplink shared channel (PUSCH) to a Next Generation NodeB (gNB) in accordance with the TBS determined at the UE; and means for decoding, at the UE, information in a selected transport block received from the gNB via a physical downlink shared channel (PDSCH) in accordance with the TBS determined at the UE.

Example 28 includes the UE of Example 27, further comprising: means for determining a number of bits associated with the TBS, wherein the number of bits is equal to $Q_m \times R \times N_{RE} \times N_L$, wherein $N_{RE}$ represents the number of assigned REs, $Q_m$ represents the scheduled modulation order from a modulation and coding scheme (MCS), R represents the intended code rate from the MCS, and $N_L$ represents the number of layers mapped to the TBS.

Example 29 includes the UE of any of Examples 27 to 28, further comprising: means for adjusting the number of assigned REs in the transport block based on an overhead adjustment factor that accounts for a variable number of unused REs due to a presence of other signals, wherein the overhead adjustment factor is separately configured for TBS determination for the PDSCH and the PUSCH; and means for determining the reference number of REs by quantizing the number of assigned REs based on the overhead adjustment factor that is indicated to the UE using one or more of physical layer signaling, medium access control (MAC) signaling, radio resource control (RRC) signaling or a pre-determined rule.

Example 30 includes the UE of any of Examples 27 to 29, further comprising: means for applying code block segmentation to the TBS to provide a single code block size for all code blocks of the TBS; and means for attaching a cyclic redundancy check (CRC) for the transport block and a code block when the code block segmentation is applied to the TBS, wherein the single code block size is a multiple of 8.

Example 31 includes the UE of any of Examples 27 to 30, further comprising: means for determining the number of assigned REs based on downlink control information or higher layer signaling received from the gNB.

Example 32 includes the UE of any of Examples 27 to 31, wherein: the reference number of PRBs is equal to a number of PRBs assigned in control information; or the TBS is defined for reduced packet sizes, and the TBS is selected from a specified set of values of reduced TB sizes and for up to a particular threshold TB size.

Example 33 includes the UE of any of Examples 27 to 32, further comprising: means for deriving all TBSs such that a code block size for each transport block is a multiple of 8, wherein a cyclic redundancy check (CRC) is attached for the transport block and a code block when code block segmentation is applied to the TBS.

Example 34 includes the UE of any of Examples 27 to 33, further comprising: means for determining the TBS based on a single slot allocation when configured with slot aggregation for the PDSCH or the PUSCH, and other slots are retransmissions of a same transport block.

Example 35 includes the UE of any of Examples 27 to 34, further comprising: means for determining the number of assigned REs using one or more of: a number of PRBs, a time domain allocation, a demodulation reference signal assigned in a slot, a channel state information reference signal (CSI-RS) or a sounding reference signal (SRS).

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to determine a transport block size (TBS), the apparatus comprising:
one or more processors configured to:
determine, at the UE, a number of assigned resource elements (REs) in one or more symbols for a transport block;
determine, at the UE, a reference number of REs per physical resource block (PRB) in the transport block based on a reference number of REs for the transport block corresponding to each PRB and an assigned number of PRBs for the transport block;
determine, at the UE, a TBS for the transport block based at least on the reference number of REs per PRB in the transport block, a scheduled modulation order, an intended code rate and a number of layers mapped to the TBS;
encode, at the UE, information in a selected transport block for transmission via a physical uplink shared channel (PUSCH) to a base station in accordance with the TBS determined at the UE; and
decode, at the UE, information in a selected transport block received from the base station via a physical downlink shared channel (PDSCH) in accordance with the TBS determined at the UE; and
a memory interface configured to send to a memory an indication of the TBS.

2. The apparatus of claim 1, further comprising a transceiver configured to:
transmit the selected transport block via the PUSCH to the base station in accordance with the TBS determined at the UE; and
receive the selected transport block via the PDSCH from the base station in accordance with the TBS determined at the UE.

3. The apparatus of claim 1, wherein the one or more processors are configured to determine a number of bits associated with the TBS, wherein the number of bits is equal to $O_m \times R \times N_{RE} \times N_L$, wherein NRE represents the number of assigned REs, Om represents the scheduled modulation order from a modulation and coding scheme (MCS), R represents the intended code rate from the MCS, and $N_L$ represents the number of layers mapped to the TBS.

4. The apparatus of claim 1, wherein the one or more processors are configured to:
adjust the number of assigned REs in the transport block based on an overhead adjustment factor that accounts for a variable number of unused REs due to a presence of other signals, wherein the overhead adjustment factor is separately configured for TBS determination for the PDSCH and the PUSCH; and
determine the reference number of REs by quantizing the number of assigned REs based on the overhead adjustment factor that is indicated to the UE using one or more of physical layer signaling, medium access control (MAC) signaling, radio resource control (RRC) signaling or a predetermined rule.

5. The apparatus of claim 1, wherein the one or more processors are configured to apply code block segmentation to the TBS to provide a single code block size for all code blocks of the TBS.

6. The apparatus of claim 5, wherein the one or more processors are configured to attach a cyclic redundancy check (CRC) for the transport block and a code block when the code block segmentation is applied to the TBS, wherein the single code block size is a multiple of 8.

7. The apparatus of claim 1, wherein the one or more processors are configured to determine the number of assigned REs based on downlink control information or higher layer signaling received from the base station.

8. The apparatus of claim 1, wherein:
the reference number of PRBs is equal to a number of PRBs assigned in control information; or
the TBS is defined for reduced packet sizes, and the TBS is selected from a specified set of values of reduced TB sizes and for up to a particular threshold TB size.

9. The apparatus of claim 1, wherein the one or more processors are configured to derive all TB Ss such that a code block size for each transport block is a multiple of 8, wherein a cyclic redundancy check
(CRC) is attached for the transport block and a code block when code block segmentation is applied to the TBS.

10. The apparatus of claim 1, wherein the one or more processors are configured to determine the TBS based on a single slot allocation when configured with slot aggregation for the PDSCH or the PUSCH, and other slots are retransmissions of a same transport block.

11. The apparatus of claim 1, wherein the one or more processors are configured to determine the number of assigned REs using one or more of: a number of PRBs, a time domain allocation, a demodulation reference signal assigned in a slot, a channel state information reference signal (CSI-RS) or a sounding reference signal (SRS).

12. At least one non-transitory machine readable storage medium having instructions embodied thereon for determining a transport block size
(TBS) at a user equipment (UE), the instructions when executed by one or more processors at the UE perform the following:
determining, at the UE, a number of assigned resource elements
(REs) in one or more symbols for a transport block;
determining, at the UE, a reference number of REs per physical resource block (PRB) in the transport block based on a reference number of REs for the transport block corresponding to each PRB and an assigned number of PRBs for the transport block;
determining, at the UE, a TBS for the transport block based at least on the reference number of REs per PRB in the transport block, a scheduled modulation order, an intended code rate and a number of layers mapped to the TBS;
encoding, at the UE, information in a selected transport block for transmission via a physical uplink shared channel (PUSCH) to a base station in accordance with the TBS determined at the UE; and
decoding, at the UE, information in a selected transport block received from the base station via a physical downlink shared channel (PDSCH) in accordance with the TBS determined at the UE.

13. The at least one non-transitory machine readable storage medium of claim 12, further comprising instructions when executed perform the following: determining a number of bits associated with the TBS, wherein the number of bits is equal to Om×Rx NRE×NL, wherein NRE represents the number of assigned REs, Om represents the scheduled modulation order from a modulation and coding scheme (MCS), R represents the intended code rate from the MCS, and NL represents the number of layers mapped to the TBS.

14. The at least one non-transitory machine readable storage medium of claim 12, further comprising instructions when executed perform the following:
adjusting the number of assigned REs in the transport block based on an overhead adjustment factor that accounts for a variable number of unused REs due to a presence of other signals, wherein the overhead adjustment factor is separately configured for TBS determination for the PDSCH and the PUSCH; and
determining the reference number of REs by quantizing the number of assigned REs based on the overhead adjustment factor that is indicated to the UE using one or more of physical layer signaling, medium access control (MAC) signaling, radio resource control (RRC) signaling or a predetermined rule.

15. The at least one non-transitory machine readable storage medium of claim 12, further comprising instructions when executed perform the following:
applying code block segmentation to the TBS to provide a single code block size for all code blocks of the TBS; and
attaching a cyclic redundancy check (CRC) for the transport block and a code block when the code block segmentation is applied to the TBS, wherein the single code block size is a multiple of 8.

16. The at least one non-transitory machine readable storage medium of claim 12, further comprising instructions when executed perform the following: determining the number of assigned REs based on downlink control information or higher layer signaling received from the base station.

17. The at least one non-transitory machine readable storage medium of claim 12, wherein:
the reference number of PRBs is equal to a number of PRBs assigned in control information; or
the TBS is defined for reduced packet sizes, and the TBS is selected from a specified set of values of reduced TB sizes and for up to a particular threshold TB size.

18. The at least one non-transitory machine readable storage medium of claim 12, further comprising instructions when executed perform the following: deriving all TBSs such that a code block size for each transport block is a multiple of 8, wherein a cyclic redundancy check (CRC) is attached for the transport block and a code block when code block segmentation is applied to the TBS.

19. The at least one non-transitory machine readable storage medium of claim 12, further comprising instructions when executed perform the following: determining the TBS based on a single slot allocation when configured with slot aggregation for the PDSCH or the PUSCH, and other slots are retransmissions of a same transport block.

20. The at least one non-transitory machine readable storage medium of claim 12, further comprising instructions when executed perform the following: determining the number of assigned REs using one or more of: a number of PRBs, a time domain allocation, a demodulation reference signal assigned in a slot, a channel state information reference signal (CSI-RS) or a sounding reference signal (SRS).

* * * * *